United States Patent [19]
Kurabayashi et al.

[11] Patent Number: 5,103,379
[45] Date of Patent: Apr. 7, 1992

[54] ELECTRICAL DOUBLE-LAYER CAPACITOR

[75] Inventors: Ken Kurabayashi, Chigasaki; Yoshinobu Tsuchiya, Fujisawa; Hiroyoshi Moroboshi, Yokohama, all of Japan

[73] Assignee: Isuzu Motors Limited, Tokyo, Japan

[21] Appl. No.: 559,354

[22] Filed: Jul. 30, 1990

[30] Foreign Application Priority Data

Sep. 2, 1989 [JP] Japan ................ 1-227779

[51] Int. Cl.⁵ .................. H01G 9/00; H01G 13/00
[52] U.S. Cl. ........................... 361/502; 29/25.03
[58] Field of Search ..................... 361/502; 29/25.03

[56] References Cited

U.S. PATENT DOCUMENTS 4,642,876  2/1987  Murray et al. ............... 361/502 X

FOREIGN PATENT DOCUMENTS 2139813A  11/1984  United Kingdom .

*Primary Examiner*—Donald A. Griffin
*Attorney, Agent, or Firm*—Spencer, Frank & Schneider

[57] ABSTRACT

An electrical double-layer capacitor cell arrangement constituted of a plural number of cells (C), and each respective upper and lower collecting electrode (1) of those cells is made as an electrode is common to all cells and has a sheet-like form. The portion of the collecting electrode sheet positioned in the boundary part between adjacent cells is made easily be cut off. In correspondence to the way of cutting off, the connecting relation between cells to each other can be made in series connection and parallel connection.

11 Claims, 4 Drawing Sheets

ELECTRICAL DOUBLE-LAYER CAPACITOR

DESCRIPTION

1. Technical Field

The present invention relates to an electrical double-layer capacitor wherein a plural number of cells are connected in an arbitrary connecting relation without making them form a high bulk assembly.

2. Background Art

FIG. 4 shows a conventional electrical capacitor cell. In FIG. 4, numeral 1 denotes a collecting electrode, 2 a polarizing electrode, 3 a separator, 4 a gasket, and C a cell.

The collecting electrode 1 is made, for example, of a conductive rubber sheet, and the gasket 4 is made, for example, of a non-conductive rubber. Also, the separator 3, is made, for example, of a polyethylene porous film.

The polarizing electrode 2 is one which has been made of active carbon powder formed into a paste-like matter and impregnated with an electro-lytic liquid (for example, dilute sulfuric acid). (By the way, as the polarizing electrode of an electrical double-layer capacitor cell, it is known to use one which is made into a solid plate-like form by sintering active carbon powder, and having an electrolytic liquid impregnated thereinto).

The gasket 4 is made in a tube-like form, and at the approximately central part of its inside, there is arranged a separator 3 in such a manner as to delimit upper and lower parts. Respective polarizing electrodes 2 fill the spaces above and below the separator 3, and a respective collecting electrodes are provided in such a manner as to cover the polarizing electrodes 2 and the gasket 4.

The gasket 4 is adhered to the collecting electrode 1 and the seperator 3, and the collecting electrode 1 is contacted to the surface of the polarizing electrode 2. The above-described adhesion is carried out by use of an adhesive agent or by heat melting.

The breakdown voltage of the cell C formed in such a manner as described above is less than several V. Therefore, in the case when it is used in a use requiring higher breakdown voltage, a number of cells C must be connected in series. Also, when the capacity is deficient, a number of cells C must be connected in parallel.

Hitherto, in relation to the technology for connecting a plural number of cells, have been proposed a method in which the collecting electrodes at the part where they become doubled at the time of laminating are laminated in a single layer (public report of the Japanese Patent Application Laid-Open No. 97770/1979), a method of connecting cells in series by the use of a conductive plate for carrying the polarizing electrodes of the neighbouring cells in common (public report of the Japanese Patent Application Laid-Open No. 162218/1980), and a method for providing a predetermined plural number of cells (for example, 4 pieces) in one body in a connecting relation previously determined (public report of the Japanese Patent Application Laid-Open No. 194417/1984).

However, in the above-described respective technologies, there still are some problems as described in the following.

At first, in the method in which cells are laminated to be connected in series such as in the case of the public report of the Japanese Patent Application Laid-Open No. 97770/1979, the entire shape of the product becomes a highly bulky one. Therefore, although the bulky shape of the product will do in the case when the space given for setting the capacitor cell is such one which is capable of receiving a bulky product, in the opposite case, the bulky product is unable to be set.

In the method of the public report of the Japanese Patent Application Laid-Open No. 162218/1980, there is the problem that together with that a number of conductive plate become required in accordance with the increase in the number of pieces in series, it becomes troublesome to effect the connection between respective cells and to effect the pulling out of terminals.

Also, in the method of the public report of the Japanese Patent Application Laid-Open No. 194417/1984, the connecting relation has been previously determined at the time of production, and it is impossible after completion of production to use it by changing to an arbitrary connecting relation, and moreover the number of pieces of the parts is many, and the price becomes expensive.

The present invention has the object of solving such problems as described above.

SUMMARY OF INVENTION

The first object of the present invention is to obtain an electrical double-layer capacitor cell having high breakdown voltage without making the entire shape bulky, but which has a desired large capacity.

The second object of the present invention is to obtain an electrical double-layer capacitor cell in which the procedure for making the cell in a desired connecting relation can be carried out by a simple procedure such as that a part of the collecting electrode is only cut off without requiring peculiar parts or a troublesome connecting procedure.

In order to attain such objects as described above, in the present invention, an electrical double-layer capacitor cell is provided, in which a plural number of cells are equipped with respective collecting electrodes made of a common sheet, and the collecting electrode sheets positioned in the boundary part between adjacent cells have been made so that they can easily be cut off.

Also, in the present invention, an electrical double-layer capacitor cell is provided in which a plural number of cells having collecting electrodes formed of a common sheet are provided, and an insulating thin film for preventing the adhesion of the collecting electrode and the gasket as one constitutional element of the cell is intervened directly under the central part of the collecting electrode sheet positioned in the boundary part between adjacent cells.

Also, in the present invention, an electrical double-layer capacitor cell is provided in which a plural number of cells having collecting electrodes formed of a common sheet are provided, and a vacancy or space for preventing the adhesion of the collecting electrode and the gasket as one constitutional element of the cell is provided directly under the central part of the collecting electrode sheet positioned in the boundary part between adjacent cells.

Further, an electrical double-layer capacitor cell is provided in which a plural number of cells having collecting electrodes formed of a common sheet are provided, and vacancies or spaces are provided between adjacent cells.

DETAILED DESCRIPTION OF THE PREFERRED EMBODIMENTS

In the following, embodiments of the present invention will be explained in detail based on the drawings.

FIRST EMBODIMENT

Figure 1:
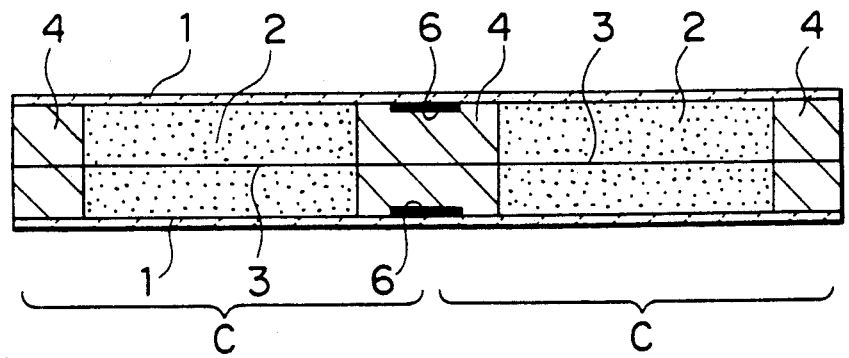
FIG. 1 is a diagram showing the electrical double-layer capacitor cell according to the first embodiment of the present invention.
Figure 4:
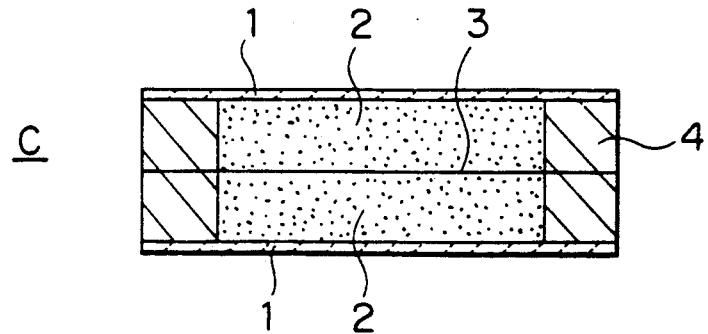
FIG. 4 is a diagram for showing a conventional electrical double-layer capacitor cell.

In FIG. 1, the electrical double-layer capacitor cell according to the first embodiment of the present invention is shown. Reference numerals corresponding to those of FIG. 4, are used for like parts and numeral 6 denotes an insulating thin film.

In the present invention, a plural number (two in FIG. 1) of cells C are providing having common collecting electrodes 1. However, in the case of adhering each collecting electrode 1 to gasket 4, at approximately in the central part of the surface of the gasket 4 between adjacent cells C, i.e. other than the gasket portions at both ends or terminals, an insulating thin film 6 is intervened. And in the part where the insulating thin film 6 has been intervened, the collecting electrode 1 and the gasket 4 are caused not to adhere.

For example, in the case when adherence is carried out by heat melting, paper, a Teflon sheet, or a plastic sheet which is not heat melted, etc. is used as the insulating thin film 6, and this is previously pasted on the gasket 4, and the collecting electrode 1 is put thereon and heat melted to the gasket. As a result of the procedure described above, the part where the collecting electrode 1 and the gasket 4 have the insulating thin film 6 between them is not heat melted.

Also, in the case when the adhesion is carried out by use of an adhesive agent, the adhesive agent is not coated on the insulating thin film 6 pasted on the gasket 4. In this a manner, the part of the collecting electrode 1 overlying the insulating thin film 6 on the gasket 4 is also not adhered to the gasket.

By the way, although in the above-described example, it has been assumed that the insulating thin film 6 is previously pasted on the gasket 4, it may also be pasted in a corresponding position to the collecting electrode 1.

Figure 5:
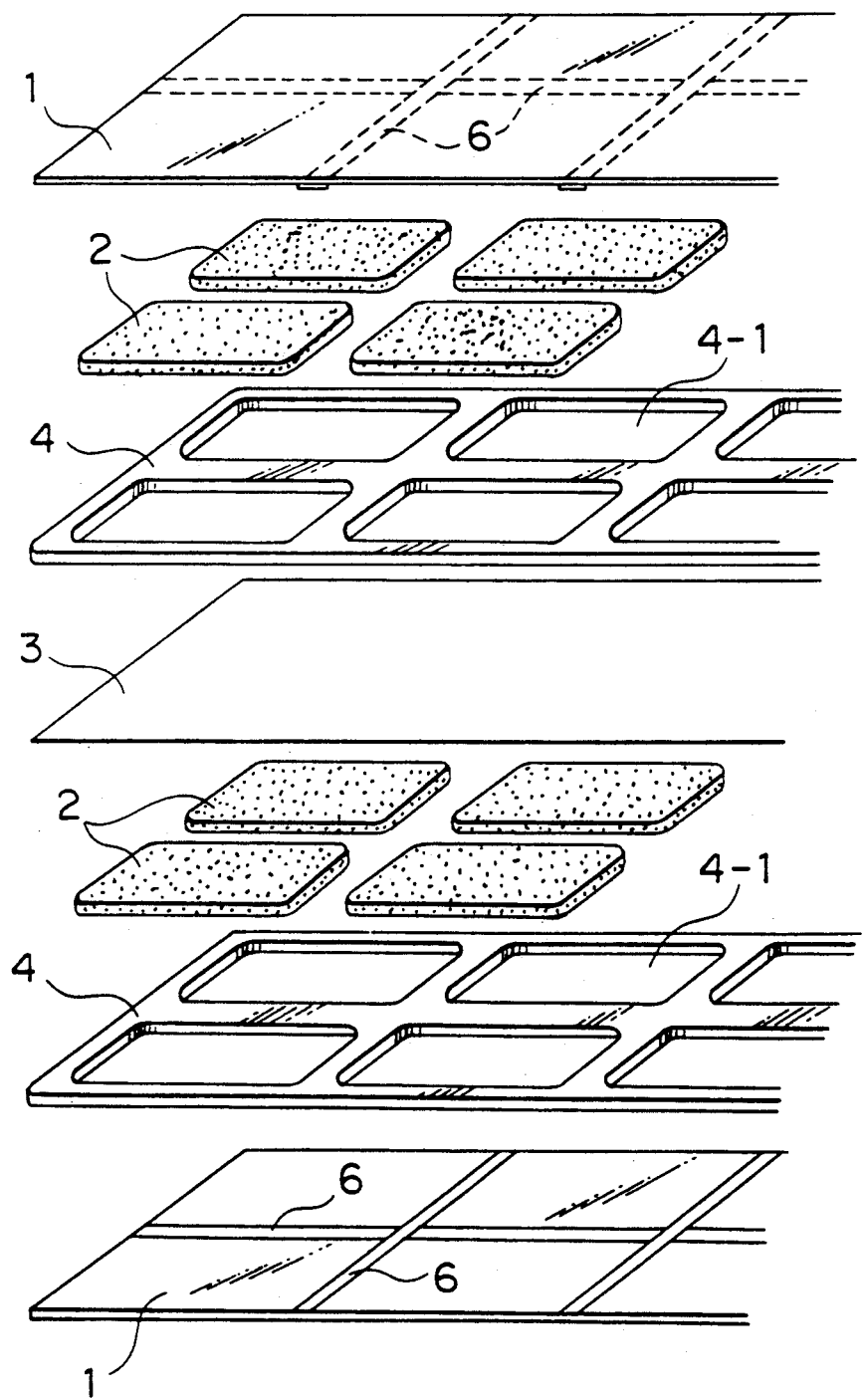
FIG. 5 is an exploded perspective diagram of the first embodiment.

FIG. 5 shows an exploded perspective view of the first embodiment wherein symbols corresponding to those of FIG. 1, are used and 4-1 denotes an open port part or space provided in the gasket 4 in order to be fill with a polarizing electrode 2. At predetermined positions on the inner surface of each collecting electrode 1, insulating thin films 6, are pasted each and open port part for filling use 4-1, is filled with a polarizing electrode 2. The polarizing electrodes 2 may be of the paste-like, or of the solid plate-like types.

The entire shape of the multi-cell arrangement produced in a manner as described above is flat plate-like and has the thickness of one cell, C and thus is not bulky. Also, respective cells C are initially all connected in parallel by the common collecting electrodes 1. In order to use this embodiment as a capacitor cell arrangement having a desired breakdown voltage and capacity, it is treated as follows.

Figure 6:
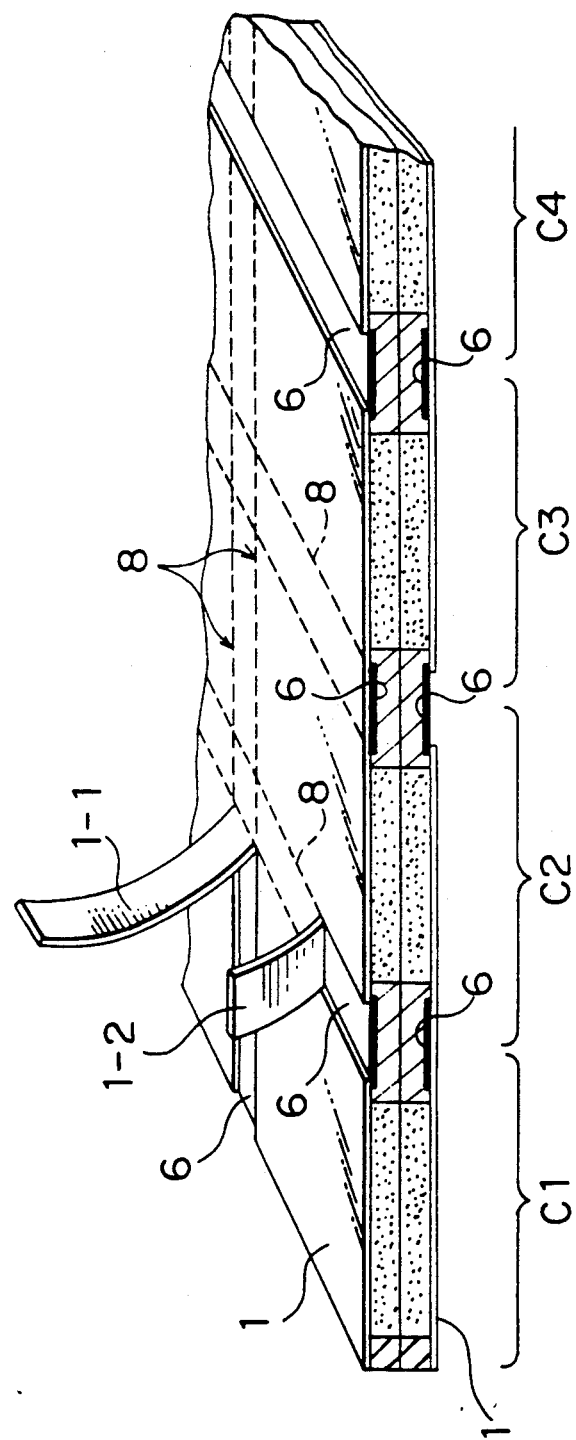
FIG. 6 is a perspective diagram in the time of use of the first embodiment.

FIG. 6 shows a perspective view of the first embodiment at the time of use, with symbols corresponding to those of FIG. 1, numeral 1-1 and 1-2 denote collecting electrode pieces, 8 denotes mark lines, and C1 to C4 are depicted on the exterior surface in such a manner as to let the position where the insulating thin films 6 are intervened be discernible from outside.

In FIG. 6, the portion of the upper collecting electrode 1 at the position where the insulating thin film 6 has been located between cells C-3 and C-4 and the portion of the lower collecting electrode at the position where the insulating thin film 6 has been located between cells C-2 and C-3 already have been is cut out a manner as shown in the figure. When the collecting electrode pieces 1-1 and 1-2, which are under intermediate way of being cut off, and the collecting electrode piece (not shown in this figure) of the lower collecting electrode 1 present at the position directly below upper the collecting electrode piece 1-1 are cut off along the mark lines 8, the cells C-1 to C-4 become all in series connection. The portions of the collecting electrodes 1 situated between the cells play the role of a conductor for connection between the respective cells.

If it is assumed that the collecting electrode piece 1-1 is cut off, but the collecting electrode piece 1-2 is not cut off, then the result is a parallel connected body of the cells C-1 and C-2 connected in series with the cell C-3.

Also, in the case when only the collecting electrode piece 1-1 and the portion of the lower collecting electrode present at the position directly below the collecting electrode piece 1-1 have been cut off, the cells C-1 to C-4 become a parallel connection.

In a manner as described above, by only performing such a simple procedure for suitably cutting off the collecting electrode 1 along the mark line 8, it becomes possible to connect cells arbitralily in series or parallel to form a capacitor cell arrangement having desired breakdown voltage and capacity.

The reason why the insulating thin film 6 has been intervened is that the adhesion of the collecting electrode 1 to the gasket 4 is prevented in order for the cutting off of the collecting electrode 1 to easily be effected.

By the way, in order for the cutting off of the collecting electrode to more easily be effected, the mark line 8 may be replaced with sewing machine needle holes. However, since the mark line 8 has only the object of being the yardstick for cutting off, it is not neccessary.

SECOND EMBODIMENT

Figure 2:
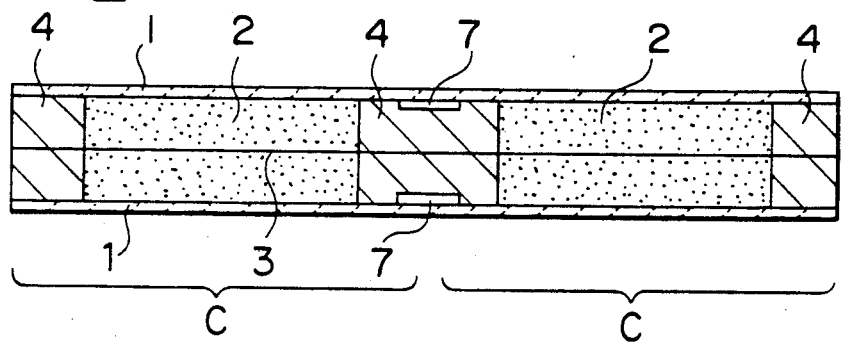
FIG. 2 is a diagram showing the electrical double-layer capacitor cell according to the second embodiment of the present invention.

FIG. 2 shows the electrical double-layer capacitor cell according to the second embodiment of the present invention. Reference symbols corresponding to those of FIG. 1 are used for like parts and numeral 7 denotes a ditch or groove.

The second embodiment can be considered as a changed example of the first embodiment, with the only difference being that, in place of the intervention of the insulating thin film 6, a ditch or groove 7 is provided in the surface of the gasket 4.

Due to the ditch 7, the collecting electrode 1 and the gasket 4 are separated for the width of the ditch, and the adhesion of the collecting electrode 1 and the gasket 4 at this location is prevented. By the way, this embodiment is possible in the case when the thickness of the gasket 4 is large.

THIRD EMBODIMENT

Figure 3:
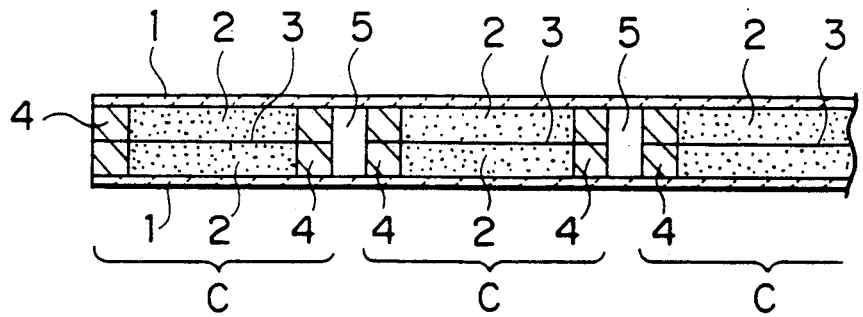
FIG. 3 is a diagram showing the electrical double-layer capacitor cell according to the third embodiment of the present invention.

FIG. 3 shows the electrical double-layer capacitor cell according to the third embodiment of the present invention. Again, reference symbols corresponding to those of FIG. 1, are used for like parts and numeral 5 denotes a gap or space.

This embodiment is one in which a plural number of individual cells C are assembled by making the collecting electrodes 1 as common electrodes or sheets and gaps 5 are provided between such cells. Therefore, the entire shape is flat plate-like and has the thickness of one cell, and all cells are initially in parallel connection.

Figure 7:
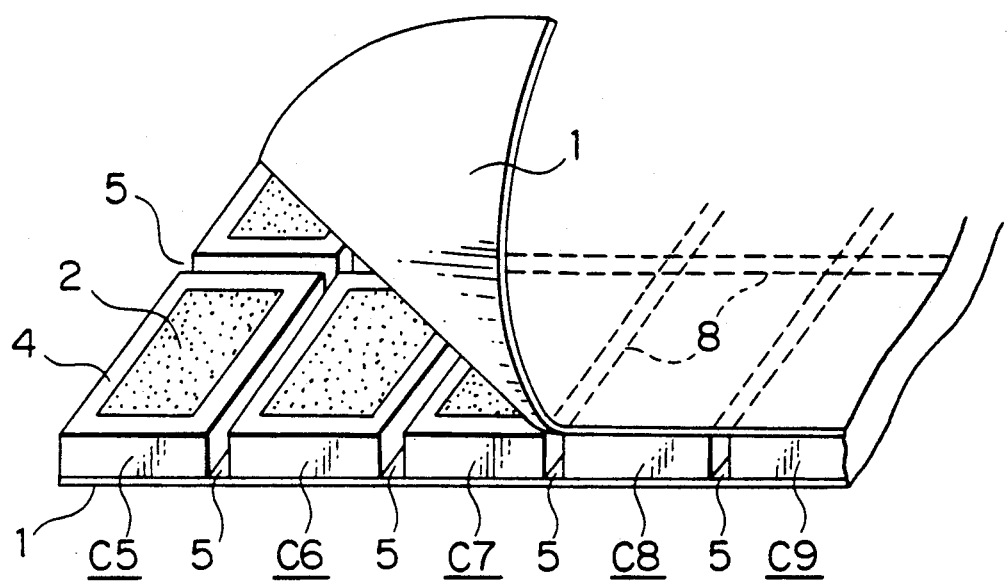
FIG. 7 is a perspective diagram for explaining the structure of the third embodiment.

FIG. 7 shows the perspective view for explaining the structure of the third embodiment. In order to make the inside structure easily understandable, there is depicted a state in which the collecting electrode 1 of on the upperside is rolled up to an intermediate position.

There are provided cells C5, C6, etc. which have the respective polarizing electrode 2 filled in the respective gaskets 4 which are separated by gaps 5. However, since the collecting electrodes 1 of all cells are again each formed as a respective single common sheet, are of the cells are in parallel connection.

Figure 8:
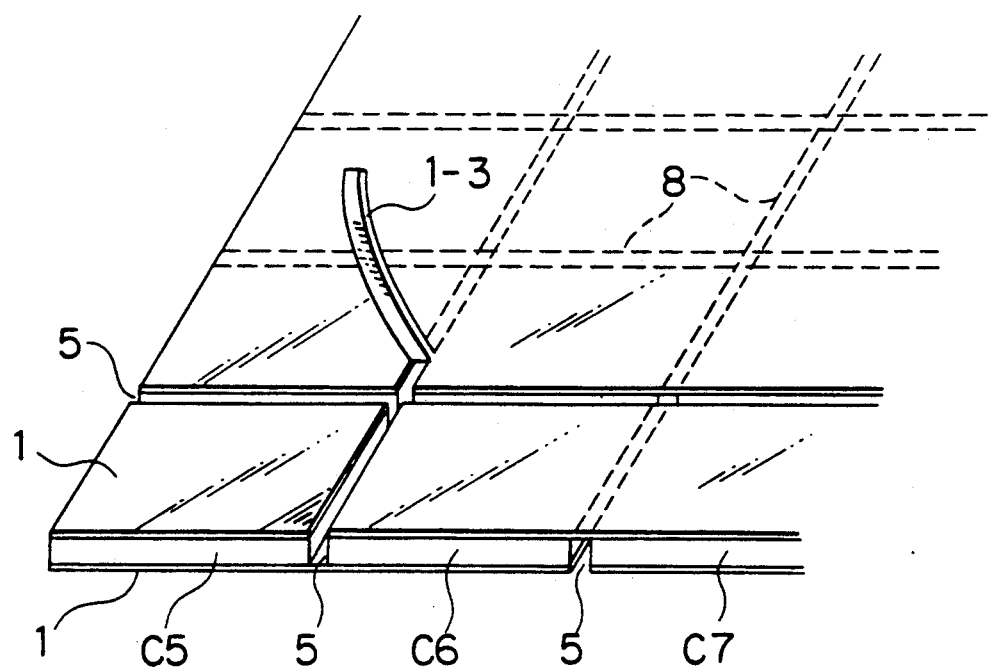
FIG. 8 is a perspective diagram in the time of use of the third embodiment.

FIG. 8 is a perspective view of the third embodiment at the time of use. Symbols corresponding to those of FIGS. 3 and 7 are used for like parts. Numeral 8 denotes a cutting mark line, and C5 to C9 individual cells.

At the time of use, in order to get the breakdown voltage and capacity corresponding to the request, a process is carried out such that the portion of the collecting electrode 1 at the position of a gap 5 is suitably cut off, and the cells are made in series connection, parallel connection, or series parallel connection.

For example, in the case when cells C5, C6 and C7 are desired to be provided in series connection, (1) the portion of the upper collecting electrode 1 covering the gap 5 between the cell C5 and the cell C6 is cut off in a manner as shown for the collecting electrode piece 1-3, (2) the portion of the collecting electrode 1 covering the gap 5 between the cells C6 and C7 is cut off, (as already shown) and (3) the portions of the upper and lower collecting electrodes 1 covering the gaps behind the cells C5, C6 and C7 are cut off (as shown for the upper electrode.

By the way, in the third embodiment, since this embodiment with the gaps 5 is liable to flex, the adherence of the capacitor cell arrangement to a curved surface and the like becomes easy.

Although the invention has been described in its prefered form with a certain degree of particularity, it is understood that the present disclosure of the prefered form has been changed in the details of construction and the combination and arrangement of parts may be resorted to without departing from the spirit and the scope of the invention as hereinafter claimed.

We claim:

1. An electrical double-layer capacitor cell arrangement characterized in that a plural number of cells having collecting electrodes formed by a common sheet of material are provided, and portions of the collecting electrodes positioned in the boundary parts between adjacent cells may easily and selectively be removed from the common sheet of the cell arrangement, whereby the collecting electrodes may be selectively interconnected.

2. An electrical double-layer capacitor cell arrangement as claimed in claim 1, characterised in that, directly under the central part of the collecting electrode positioned in the boundary portion of the cells, an insulating thin film for preventing the adhesion of the collecting electrode to the gasket as one of the constitutional elements of the cell is intervened.

3. An electrical double-layer capacitor cell arrangement as claimed in claim 1, characterised in that a vacant gap for preventing the adhesion of the collecting electrode to the gasket as one of the constitutional elements of the cell is provided directly under the central portion of the collecting electrode positioned in the boundary part between cells.

4. An electrical double-layer capacitor cell arrangement as claimed in claim 1, characterised in that vacant gaps are provided between cells.

5. In an electrical double-layer capacitor cell arrangement including a plurality of double-layer capacitor cells, each including first and second polarizing electrodes separated by a separator, gasket material laterally surrounding said first and second polarizing electrodes, and first and second collecting electrodes covering and contacting said first and second polarizing electrodes respectively and adhering to the surrounding respective adjacent surface of said gasket material, and wherein said first and second collecting electrodes are respective sheets of conductive material which are common to all of said plurality of cells; the improvement comprising means, disposed in the boundary region between adjacent ones of said cells, for permitting the selective easy removal of portions of each of said sheets between adjacent said cells, whereby said plurality of cells can selectively be connected in series or in parallel.

6. An electrical double-layer capacitor cell arrangement as claimed in claim 5 wherein: said gasket material fills the lateral space between adjacent ones of said cells; and said means comprises a respective insulating thin film, which for prevents the adhesion of the respective collecting electrode sheet to the gasket material, disposed directly under a central portion of the associated said collecting electrode sheet in said boundary region between adjacent said cells, whereby the portions of the respective collecting electrode sheet extending over said insulating films may be selectively removed.

7. An electrical double-layer capacitor cell arrangement as claimed in claim 6 wherein: said separator of each of said cells is formed by a single sheet of separator material common to each of said plurality of cells; and said gasket material comprises a first sheet of gasket material, having openings for each of said first polarizing electrodes, disposed between one surface of said sheet of separator material and the one of said sheets of conductor material constituting said first collecting electrodes, and a second sheet of gasket material, having openings for each of said second polarizing electrodes, disposed between the surface of said sheet of separator material opposite said one surface and the one of said sheets of conductive material constituting said second collecting electrodes.

8. An electrical double-layer capacitor cell arrangement as claimed in claim 5 wherein: said gasket material fills the lateral space between ones of said cells; and said means comprises respective recesses, which prevent adhesion of the respective said collecting electrode sheet to said gasket material, provided in the surface of said gasket material directly under a central part of the respective collecting electrode sheet in said boundary region between adjacent said cells, whereby the portions of said collecting electrode sheets extending over said recesses may be selectively easily removed.

9. An electrical double-layer capacitor cell arrangement as claimed in claim 8 wherein: said separator of each of said cells is formed by a single sheet of separator material common to each of said plurality of cells; and said gasket material comprises a first sheet of gasket material, having openings for each of said first polarizing electrodes, disposed between one surface of said sheet of separator material and the one of said sheets of conductor material constituting said first collecting electrodes, and a second sheet of gasket material, having openings for each of said second polarizing electrodes, disposed between the surface of said sheet of separator material opposite said one surface and the one of said sheets of conductive material constituting said second collecting electrodes.

10. An electrical double-layer capacitor cell arrangement as claimed in claim 5 wherein said means comprise vacant gaps provided between said gasket material of adjacent cells, whereby portions of said collecting electrode sheets extending over said gaps may be selectively easily removed.

11. An electrical double-layer capacitor cell arrangement comprising: a plurality of double-layer capacitor cells having respective collecting electrodes formed by a common sheet of conductive material; and means, disposed in boundary portions of the arrangement between adjacent said cells, for permitting the selective easy removal of portions of said sheet in the boundary regions between adjacent said cells, whereby said collecting electrodes may be selectively interconnected in a desired manner.

* * * * *